United States Patent
Sanada et al.

(10) Patent No.: US 9,811,647 B2
(45) Date of Patent: Nov. 7, 2017

(54) ELECTRONIC DEVICE, METHOD AND STORAGE MEDIUM

(71) Applicant: Kabushiki Kaisha Toshiba, Minato-ku, Tokyo (JP)

(72) Inventors: Toshitaka Sanada, Ome Tokyo (JP); Akihiro Koga, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 14/928,019

(22) Filed: Oct. 30, 2015

(65) Prior Publication Data

US 2016/0275273 A1  Sep. 22, 2016

Related U.S. Application Data

(60) Provisional application No. 62/134,978, filed on Mar. 18, 2015.

(51) Int. Cl.
*G06F 21/34* (2013.01)
*G06F 21/31* (2013.01)
*G06F 21/82* (2013.01)
*G06F 21/73* (2013.01)

(52) U.S. Cl.
CPC .............. *G06F 21/31* (2013.01); *G06F 21/73* (2013.01); *G06F 21/82* (2013.01)

(58) Field of Classification Search
None
See application file for complete search history.

(56) References Cited

U.S. PATENT DOCUMENTS

| | | | |
|---|---|---|---|
| 6,175,926 B1 * | 1/2001 | Fogle | G06F 21/31 726/19 |
| 9,405,890 B1 * | 8/2016 | Nishitani | G06F 21/31 |
| 2009/0119785 A1 * | 5/2009 | Challener | G06F 21/31 726/34 |
| 2016/0342423 A1 * | 11/2016 | Hulbert | G06F 9/4411 |

FOREIGN PATENT DOCUMENTS

| JP | 2001-014053 A | 1/2001 |
|---|---|---|
| JP | 2010-231712 A | 10/2010 |

OTHER PUBLICATIONS

"Extended Display Identification Data", Wikipedia, the free encyclopedia, Apr. 2, 2015, pp. 1-14, http://en.wikipedia.org/wiki/Extended_Display_Identification_Data.

* cited by examiner

*Primary Examiner* — Fatoumata Traore
(74) *Attorney, Agent, or Firm* — Knobbe, Martens, Olson & Bear LLP

(57) ABSTRACT

According to one embodiment, an electronic device includes one or more connectors configured to connect external devices, and circuitry. The circuitry is configured to detect that the external devices are connected to the one or more connectors, and to authenticate access of a user based on an order in which the external devices are connected to the one or more connectors.

15 Claims, 5 Drawing Sheets

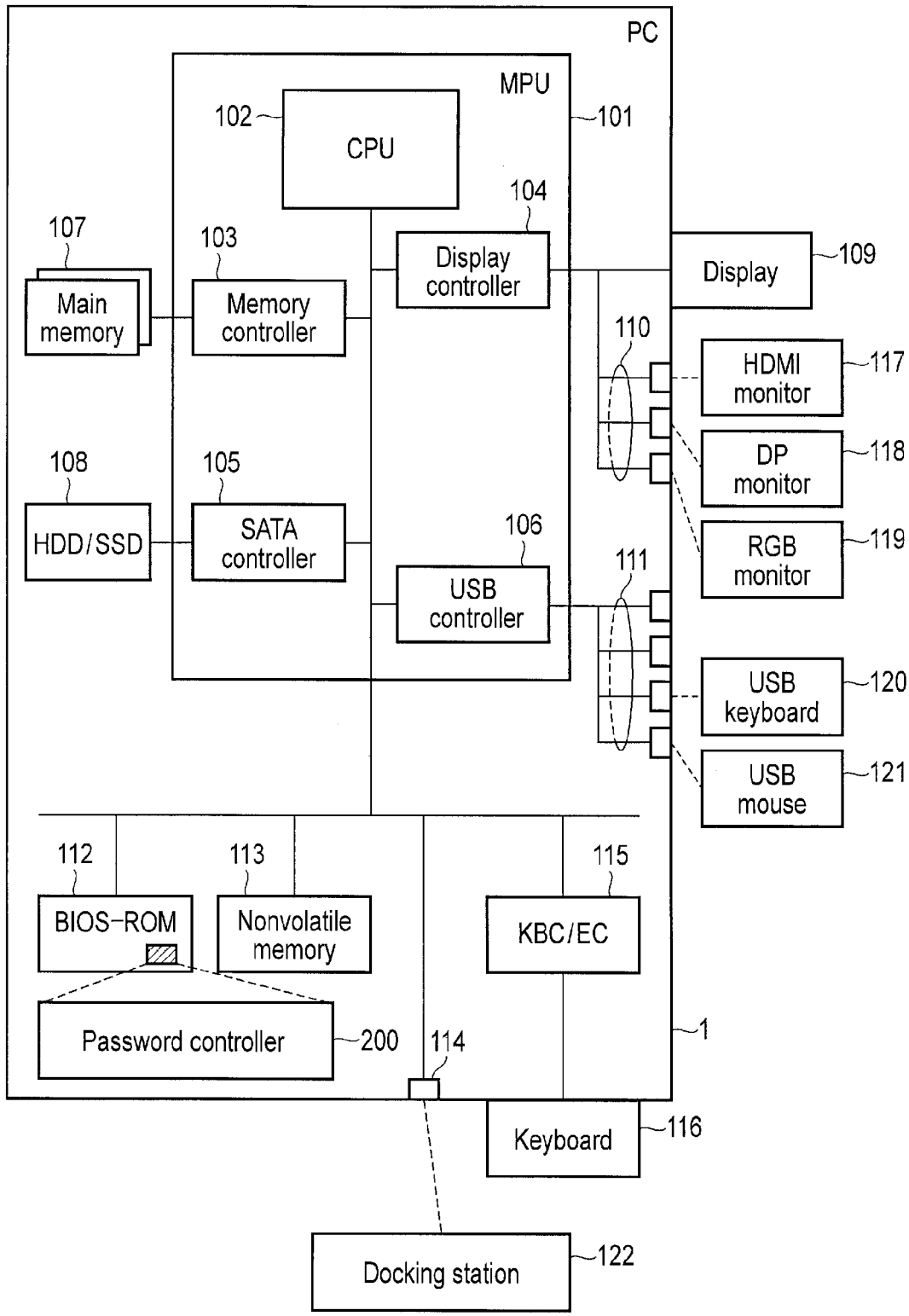
F I G. 2

List of connected external devices

Set order of connection for devices to register as password

[ ] USB keyboard

[ ] HDMI monitor

[ ] Docking station

F I G. 3

List of connected external devices

Set order of connection for devices to register as password

[ 1 ] USB keyboard

[ 2 ] HDMI monitor

[ ] Docking station

Register? [Y/N]

F I G. 4

ELECTRONIC DEVICE, METHOD AND STORAGE MEDIUM

CROSS-REFERENCE TO RELATED APPLICATIONS

This application claims the benefit of U.S. Provisional Application No. 62/134,978, filed Mar. 18, 2015, the entire contents of which are incorporated herein by reference.

FIELD

Embodiments described herein relate generally to an electronic device, a method and a storage medium.

BACKGROUND

In recent years, battery-operated, portable electronic devices, for example, notebook personal computers (PCs), have been widely used. This kind of electronic device has a function of setting a password as a security measure to prevent itself from being abused by a person other than a valid user.

If a password is set, the password needs to entered whenever an electronic device is used even in an environment where the risk of abuse is extremely low, for example in a house or an office, whereby the convenience of the electronic device is impaired. If a complex and difficult password is set, the password may also be forgotten. However, if a password is not set for this kind of electronic device which excels in portability and can be used in various environments in which a person is going out or is moving, etc., abuse will be permitted at a point in time when others (persons other than a valid user) are given a chance to use the device. In addition, also in the case where a simple password is set with priority given to convenience, it is highly likely that the password will be discovered by, for example, prying or guessing, and the device will be abused.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary illustration showing an example of a system configuration of the electronic device of the embodiment.

FIG. 3 is an exemplary illustration showing an example of a setting screen of an alternative password displayed in the electronic device of the embodiment.

FIG. 4 is an exemplary illustration showing an example of setting the alternative password on the setting screen of FIG. 3.

DETAILED DESCRIPTION

Various embodiments will be described hereinafter with reference to the accompanying drawings.

In general, according to one embodiment, an electronic device includes one or more connectors configured to connect to external devices, and circuitry. The circuitry is configured to detect that the external devices are connected to the one or more connectors, and to authenticate access of a user based on an order in which the external devices are connected to the one or more connectors.

Figure 1:
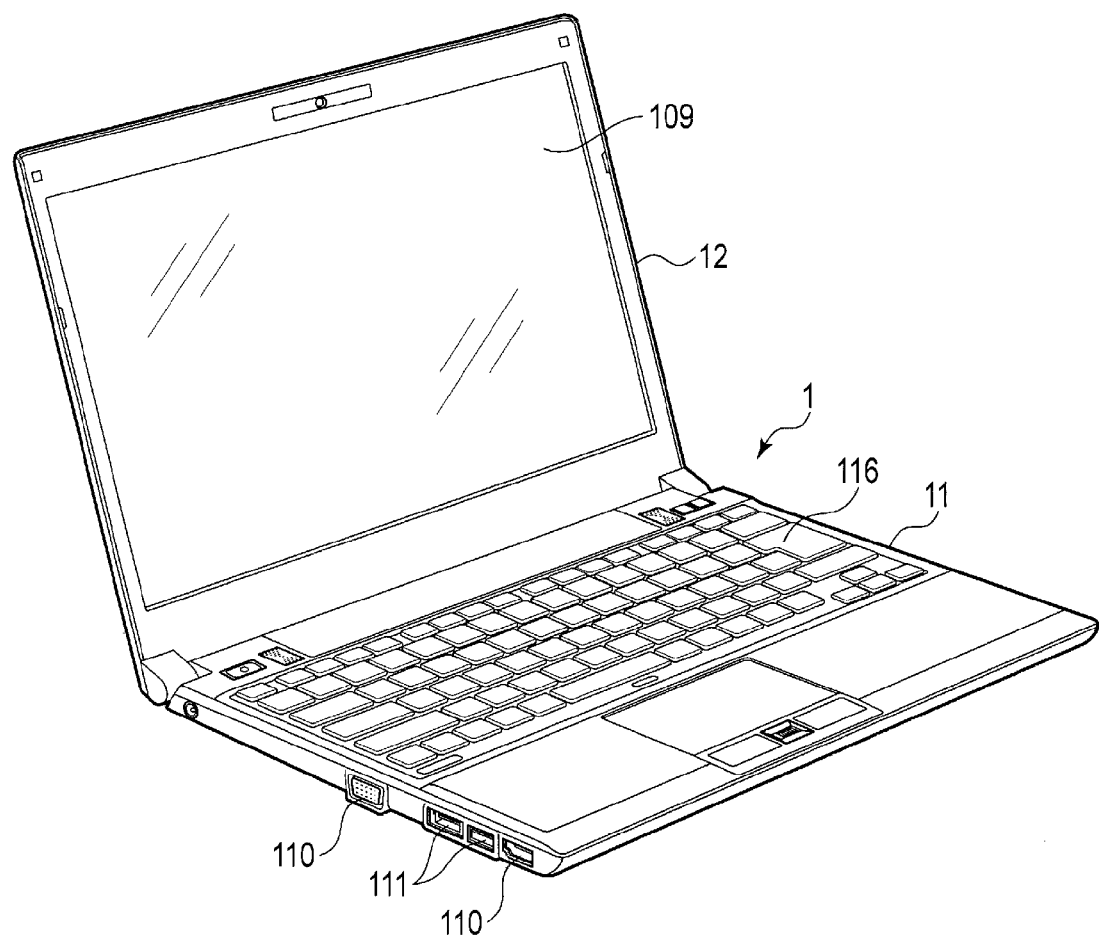
FIG. 1 is an exemplary illustration showing an example of an outside of an electronic device of an embodiment.

FIG. 1 is an exemplary illustration showing an example of an outside of an electronic device of a present embodiment. As shown in FIG. 1, the electronic device can be implemented as, for example, a notebook PC 1.

FIG. 1 is a front perspective view of the computer 1 with a display unit open. The PC 1 comprises a main body 11 and a display unit 12. A display 109 is incorporated in the display unit 12.

The display unit 12 is attached to the main body 11 to be rotatable between an open position at which a top surface of the main body 11 is exposed and a closed position at which the top surface of the main body 11 is covered by the display unit 12. The main body 11 comprises a housing in the shape of a thin box, and a keyboard 116 is disposed on a top surface thereof.

In addition, several connectors 110 for connecting external displays and several USB ports 111 for connecting universal serial bus (USB) devices are provided on a side surface of the main body 11. The connectors 110 conform to the High-definition Multimedia Interface (HDMI)/DisplayPort/RGB standard, etc., and the USB ports 111 conform to the USB standard. Moreover, although not shown in FIG. 1, a connector 114 for connecting an extension unit referred to as a docking station or the like is provided on a back surface of the computer main body 11.

FIG. 2 is an exemplary illustration showing an example of a system configuration of the PC 1. As shown in FIG. 2, the PC 1 comprises a CPU 102, a memory controller 103, a display controller 104, a Serial AT Attachment (Serial ATA [SATA]) controller 105, and a USB controller 106. These can be implemented as a single IC (MPU 101). In addition, the PC 1 comprises a main memory 107, a hard disk drive (HDD)/solid-state drive (SSD) 108, the above-described display 109, the above-described connectors 110, the above-described USB ports 111, a BIOS-ROM 112, a nonvolatile memory 113, the above-described connector 114, a keyboard controller (KBC)/embedded controller (EC) 115, and the above-described keyboard 116. Moreover, although not shown in FIG. 2, the PC 1 is equipped with various Peripheral Component Interconnect (PCI) devices, Low Pin Count (LPC) devices, etc.

The CPU 102 controls operation of various components of the PC 1. The CPU 102 can cause the PC 1 to operate variously by loading various programs (application programs including an OS, a BIOS, and a utility, etc.) stored in the HDD/SSD 108 and the BIOS-ROM 112 to the main memory 107 and executing the programs. The BIOS stored in the BIOS-ROM 112 includes a password control module 200 which will be described later.

The memory controller 103 exerts access control over the main memory 107. The display controller 104 controls the display 109, and also controls external displays (an HDMI monitor 117, a DisplayPort monitor 118, an RGB monitor 119, etc.) connected to the connectors 110. The SATA controller 105 controls a storage device (the HDD/SSD 108 herein) conforming to the SATA interface standard. The USB controller 106 controls USB devices (a USB keyboard 120, a USB mouse 121, etc.) connected to the USB ports 111.

The nonvolatile memory 113 is a storage medium used to save various setting data items on the PC 1. The KBC/EC 115 controls key entry from the keyboard 116.

Next, a function of the password control module 200 (included in the BIOS) operating on the PC 1 having the above-described configuration will be described. It should be noted that not only the BIOS but the OS, for example, may include the function of the password control module 200.

The password control module 200 relates to security measures which prevent the PC 1 from being abused by a person other than a valid user, and provides a mechanism of improving the convenience of a widespread authentication technique of identifying a user as a valid user by causing the user to enter a preset password when using the PC 1.

As described above, the PC 1 comprises the connectors 110, the USB ports 111, and the connector 114. Thus, the password control module 200 can authenticate a user by the order in which external devices are connected to the connectors 110, the USB ports 111, and the connector 114. That is, the user, for example, can use the PC 1 only by connecting external devices in predetermined order without inputting a complex and difficult password, while setting the complex and difficult password.

Therefore, the password control module 200 firstly has a function of setting the order in which external devices are connected as a password. For the sake of simplicity, the order in which external devices are connected set as a password is herein referred to as an alternative password. The password control module 200 provides a user interface for the user to set an alternative password. Needless to say, the password control module 200 has a function of setting a (normal) password, and provides a user interface for the user to set a password. Either a password or an alternative password may be set, or both of them may be set. Both of them may not be set.

When setting an alternative password, the user activates an alternative password setting function of the password control module 200 in the state where external devices to apply to the alternative password are connected to the PC 1. More specifically, the user performs an operation for causing a setting screen of an alternative password to be displayed on the PC 1. When the operation is performed, the password control module 200 acquires identification data from external devices connected to the PC 1, and displays a list of the external devices based on the acquired identification data. As identification data of external devices, for example, extended display identification data (EDID) of a display device and a descriptor of a USB device can be used. FIG. 3 shows an example of the setting screen of an alternative password displayed by the password control module 200.

It is herein assumed that the USB keyboard 120, the HDMI monitor 117, and a docking station 122 are connected to the USB port 111, the connector 110, and the connector 114, respectively. In this case, "USE keyboard", "HDMI monitor" and "Docking station" are displayed in a list on the setting screen of an alternative password as shown in FIG. 3.

On the setting screen of an alternative password on which external devices are thus displayed in a list as options, the user selects external devices to be applied to an alternative password while designating the order in which they are connected. It is herein assumed that the user intends that the PC 1 will be available if the USB keyboard 120 is connected to the USB port 111 and the HDMI monitor 117 is connected to the connector 110.

In this case, the user performs an operation of inputting "1" to the item "USB keyboard" and inputting "2" to the item "HDMI monitor" as shown in FIG. 4, using, for example, the USB keyboard 120 (connected to the USB port 111). When some input is performed on the setting screen of an alternative password, the password control module 200 displays a message inquiring whether to register a set alternative password, and saves settings on the setting screen in, for example, the nonvolatile memory 113 if an operation for registration, for example, an operation of inputting "Y", is performed. That is, the connection to the PC 1 in the order of (1) the USB keyboard and (2) the HDMI monitor is set as an alternative password. If a password is set, the password is also saved in, for example, the nonvolatile memory 113.

Let us next assume the case where the PC 1 for which such an alternative password is set is, for example, powered on. In addition, it is herein assumed that a complex and difficult password is set.

When the PC 1 is powered on, a user authentication function of the password control module 200 is activated. The password control module 200 examines whether or not a password (at least one of a password and an alternative password) is set, and if the password is set, displays a screen (password entry screen) for causing the user to enter the password. If a valid password is entered on the password entry screen, the password control module 200 authenticates the user as a valid user and permits the user to use the PC 1.

In addition, if an external device is connected to PC 1 while the password entry screen is displayed, the password control module 200 acquires identification data on the external device. Whenever an external device is connected to the PC 1, the password control module 200 acquires identification data on the external device. Then, the password control module 200 examines whether or not the order in which external devices are connected to the PC 1 matches the order set as an alternative password based on the identification data, and if it matches, authenticates the user as a valid user and permits the user to use the PC 1. That is, the password control module 200 secondly has a function of authenticating the user by the order in which external devices are connected.

Accordingly, the user can use the PC 1 by connecting the USE keyboard 120 to the USE port 111 and connecting the HDMI monitor 117 to the connector 110 instead of inputting a complex and difficult password.

Figure 5:
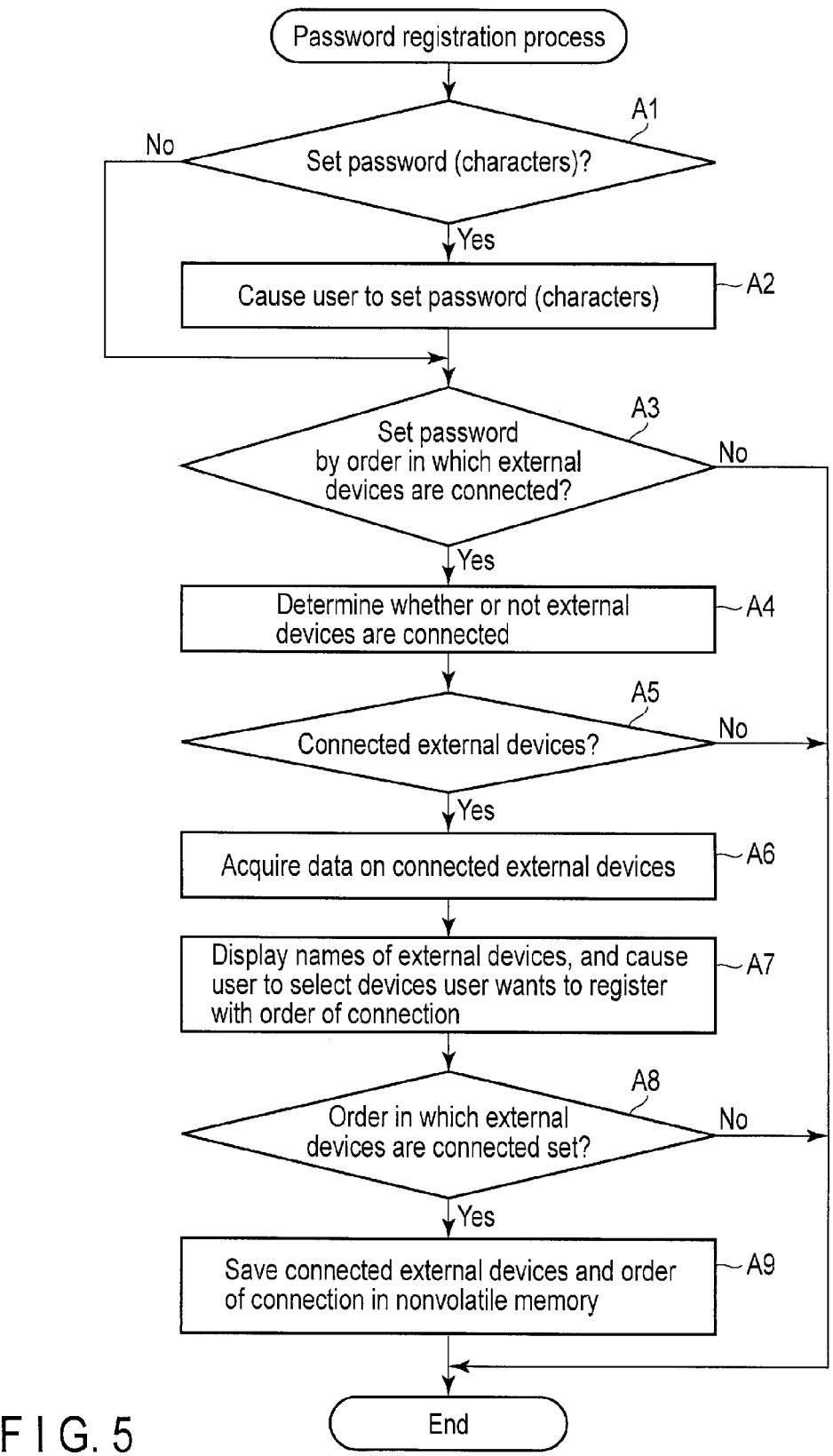
FIG. 5 is an exemplary flowchart showing an operating procedure related to password registration of the electronic device of the embodiment.

FIG. 5 is an exemplary flowchart showing an operating procedure related to password registration of the PC 1 (password control module 200).

If a request to set a password, that is, set an arbitrary character string as a password, is made (Yes in block A1), the PC 1 causes the user to set an arbitrary character string (block A2). In addition, if a request to set an alternative password, that is, set the order in which external devices are connected as a password, is made (Yes in block A3), the PC 1 first examines whether or not external devices are connected (block A4). If there are connected external devices (Yes in block A5), the PC 1 acquires data on the external devices (block A6).

The PC 1 displays the names of the external devices based on the acquired data, and causes the user to select external devices the user wants to register as an alternative password with the order of connection (block A7). If the order in which the external devices are connected is set (Yes in block A8), the PC 1 saves the order in which the external devices are connected in the nonvolatile memory 113 (block A9).

Figure 6:
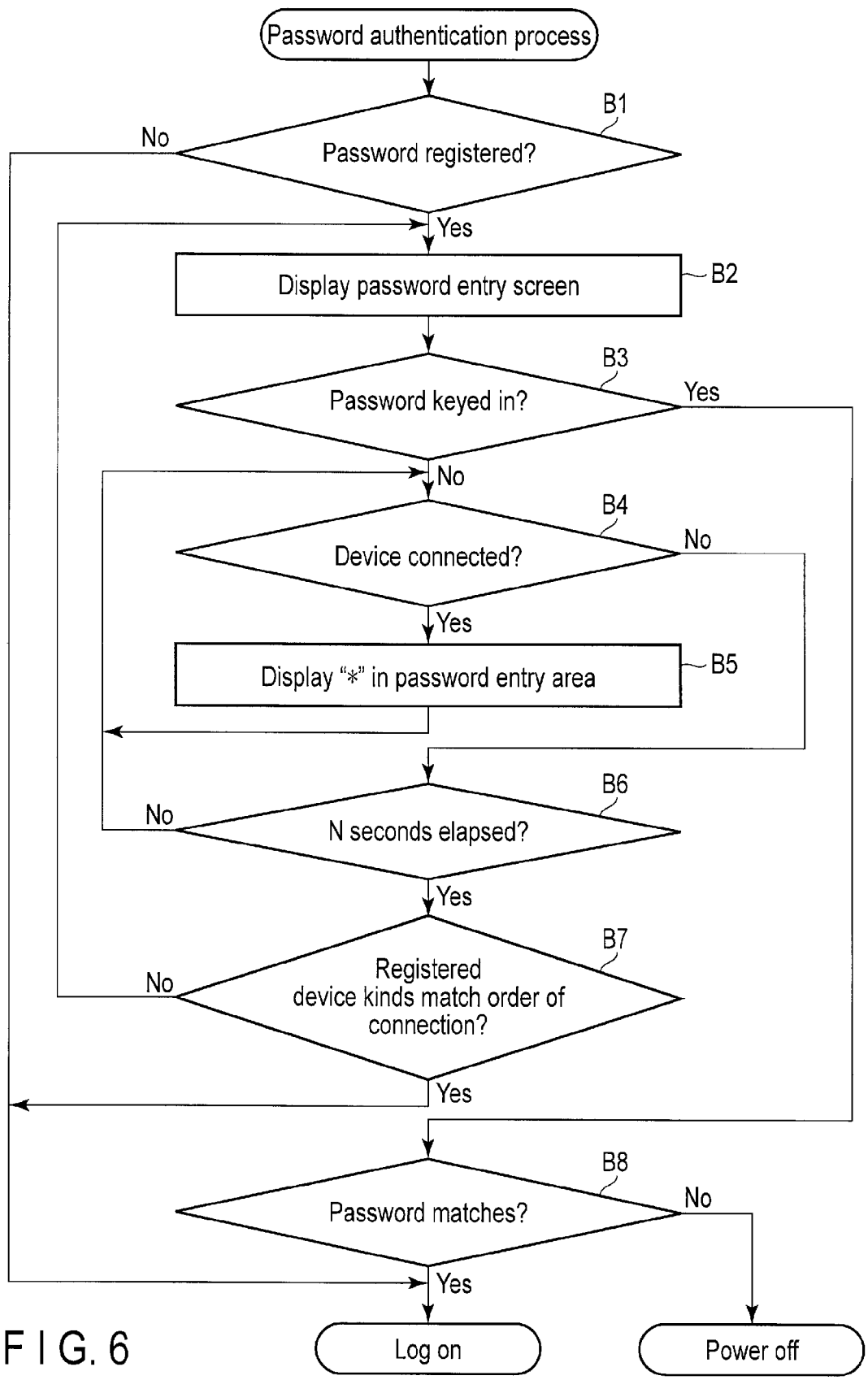
FIG. 6 is an exemplary flowchart showing an operating procedure related to password authentication of the electronic device of the embodiment.

In addition, FIG. 6 is an exemplary flowchart showing an operating procedure related to password authentication of the PC 1 (password control module 200).

For example, when it is powered on, the PC 1 examines whether or not a password is set (block B1), and if set (Yes in block B1), displays the password entry screen (block B2).

If a password is keyed in (Yes in block B3), the PC 1 examines whether or not the password keyed in matches the set password (block B8). If the password matches (Yes in block B8), the PC 1 authenticates the user as a valid user and permits the user to log on. If the password does not match (No in block B8), the PC 1 is powered off.

On the other hand, if an external device is connected (No in block B3, Yes in block B4), the PC 1 displays "." in a password entry area on the password entry screen, and waits for a predetermined time (N seconds) to elapse (block B6). If an external device is further connected before N seconds elapses (No in block B6 and Yes in block B4), the PC 1 displays further "." in the password entry area on the password entry screen (block B5). If no external device is further connected and N seconds elapsed (Yes in block B6), the PC 1 examines whether or not the order in which the external devices are connected matches a set order (block B7). If the order matches (Yes in block B7), the PC 1 authenticates the user as a valid user and permits the user to log on. If the password does not match (No in block B7), the PC 1 returns to displaying the password entry screen of block B2.

In this manner, according to the PC 1, the convenience of a widespread authentication technique of identifying a user as a valid user is improved.

In the above description, an example of authenticating the user as a valid user if (1) the USB keyboard and (2) the HDMI monitor are connected to the PC 1 in this order has been given. The technique of authenticating a user by the order in which external devices are connected is not limited to this example, and is variously applicable.

For example, the user may also be authenticated as a valid user if a specific USB keyboard and a specific HDMI monitor are connected. Moreover, the user may also be authenticated as a valid user if a USB keyboard is connected to a specific USB port and an HDMI monitor is connected to a specific connector, by determining to which port or connector an external device is connected. Furthermore, the user may also be authenticated as a valid user if a specific USB keyboard is connected to a specific USB port and a specific HDMI monitor is connected to a specific connector. In addition, focusing on determining to which port or connector an external device is connected, it may also be determined whether or not the user is a valid user only on the basis of the order of ports or connectors to which the external devices are connected, whichever external devices are connected.

Various functions disclosed in the embodiments may be each implemented by circuitry. Examples of the circuitry include a programmed processor such as a central processing unit (CPU). The processor executes each of the disclosed functions by executing a program stored in a memory. The processor may be a microprocessor including an electric circuit. The examples of the circuitry also include a digital signal processor (DSP), an application-specific integrated circuit (ASIC), a microcontroller, a controller, and other electric circuit components.

Because various processes of the embodiments can be implemented by a computer program, the same advantages as those of the embodiments can be easily achieved by installing the computer program in a normal computer through a computer-readable storage medium storing the computer program and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a non-volatile memory;
two or more connectors configured to connect to external devices; and
circuitry configured to:
perform a registration function for an alternative password, the registration function comprising:
acquiring identification data items for the external devices;
providing a user interface to allow a user to select, based at least in part on the identification data items for the external devices, a connection order of the external devices to be designated as the alternative password; and
storing the alternative password in the nonvolatile memory; and
perform a function for authenticating the user based on the alternative password if the alternative password has been previously registered, the authenticating function comprising:
detecting that the external devices are connected to the two or more connectors; and
authenticating the user and providing access to the electronic device if the order in which the external devices are connected to the two or more connectors corresponds to the alternative password.

2. The electronic device of claim 1, wherein, as part of the authenticating function, the circuitry is configured to acquire the identification data items for the external devices connected to the two or more connectors to determine if the order in which the external devices are connected to the two or more connectors corresponds to the alternative password.

3. The electronic device of claim 1, wherein, as part of the authenticating function, the circuitry is configured to determine kinds of the external devices connected to the two or more connectors to determine if the order in which the external devices are connected to the two or more connectors corresponds to the alternative password.

4. The electronic device of claim 1, wherein, as part of the authenticating function, the circuitry is configured to acquire the identification data items from the external devices connected to the two or more connectors and to determine respective connections made between the two or more connectors and the external devices to determine if the order in which the external devices are connected to the two or more connectors corresponds to the alternative password.

5. The electronic device of claim 1, wherein, as part of the authenticating function, the circuitry is configured to determine respective connections between the two or more connectors and the external devices to determine if the order in which the external devices are connected to the two or more connectors corresponds to the alternative password.

6. A method of an electronic device, the method comprising:
performing a registration function for an alternative password, the registration function comprising:
acquiring identification data items for external devices configured to be connected to the electronic device via two or more connectors;
providing a user interface to allow a user to select, based at least in part on the identification data items for the external devices, a connection order of the external devices to be designated as the alternative password; and
storing the alternative password in a nonvolatile memory; and
performing a function for authenticating the user based on the alternative password if the alternative password has been previously registered, the authenticating function comprising:
detecting that the external devices are connected to the two or more connectors; and
authenticating the user and providing access to the electronic device if the order in which the external devices are connected to the two or more connectors corresponds to the alternative password.

7. The method of claim 6, wherein, as part of the authenticating function, the method further comprises acquiring identification data items for the external devices connected to the two or more connectors to determine if the order in which the external devices are connected to the two or more connectors corresponds to the alternative password.

8. The method of claim 6, wherein, as part of the authenticating function, the method further comprises determining kinds of the external devices connected to the two or more connectors to determine if the order in which the external devices are connected to the two or more connectors corresponds to the alternative password.

9. The method of claim 6, wherein, as part of the authenticating function, the method further comprises acquiring the identification data items from the external devices connected to the two or more connectors and determining respective connections between the two or more connectors and the external devices to determine if the order in which the external devices are connected to the two or more connectors corresponds to the alternative password.

10. The method of claim 6, wherein, as part of the authenticating function, the method further comprises determining respective connections between the two or more connectors and the external devices to determine if the order in which the external devices are connected to the two or more connectors corresponds to the alternative password.

11. A non-transitory computer-readable storage medium having stored thereon a computer program which is executable by a computer, the computer program controlling the computer to execute functions of:
performing a registration function for an alternative password, the registration function comprising:
acquiring identification data items for external devices configured to be connected to the computer via two or more connectors;
providing a user interface to allow a user to select, based at least in part on the identification data items for the external devices, a connection order of the external devices to be designated as the alternative password; and
storing the alternative password in a nonvolatile memory; and
performing a function for authenticating the user based on the alternative password if the alternative password has been previously registered, the authenticating function comprising:
detecting that the external devices are connected to the two or more connectors; and
authenticating the user and providing access to the computer if the order in which the external devices are connected to the two or more connectors corresponds to the alternative password.

12. The medium of claim 11, wherein, as part of the authenticating function, the computer program controls the computer to acquire identification data items for the external devices connected to the two or more connectors to determine if the order in which the external devices are connected to the two or more connectors corresponds to the alternative password.

13. The medium of claim 11, wherein, as part of the authenticating function, the computer program controls the computer to determine kinds of the external devices connected to the two or more connectors to determine if the order in which the external devices are connected to the two or more connectors corresponds to the alternative password.

14. The medium of claim 11, wherein as part of the authenticating function, the computer program controls the computer to acquire the identification data items from the external devices connected to the two or more connectors and to determine respective connections made between the two or more connectors and the external devices to determine if the order in which the external devices are connected to the two or more connectors corresponds to the alternative password.

15. The medium of claim 11, wherein, as part of the authenticating function, the computer program controls the computer to determine respective connections made between the two or more connectors and the external devices to determine if the order in which the external devices are connected to the two or more connectors corresponds to the alternative password.

* * * * *